United States Patent [19]

Fuchs

[11] 3,951,944
[45] Apr. 20, 1976

[54] FIBER-REACTIVE, WATER-SOLUBLE DISAZO DYES CONTAINING AN N-B-SULFOETHYLAMIDE GROUP

[75] Inventor: Hermann Fuchs, Kelkheim, Taunus, Germany

[73] Assignee: Hoechst Aktiengesellschaft, Frankfurt am Main, Germany

[22] Filed: Nov. 29, 1972

[21] Appl. No.: 310,363

[30] Foreign Application Priority Data
Nov. 30, 1971 Germany............................ 2159216

[52] U.S. Cl................................. 260/186; 260/155; 260/160; 260/174; 260/176; 260/178; 260/184; 260/187; 260/188; 260/190; 260/191

[51] Int. Cl.² .................. C09B 31/04; C09B 31/06; C09B 31/10; C09B 31/14

[58] Field of Search ........... 260/160, 174, 176, 178, 260/184, 186, 187, 188, 190, 191

[56] References Cited
UNITED STATES PATENTS

| | | | |
|---|---|---|---|
| 2,142,838 | 1/1939 | Fischer et al. | 260/184 |
| 2,221,029 | 11/1940 | McNally et al. | 260/206 |
| 2,317,387 | 4/1943 | Kvalnes et al. | 260/160 |

Primary Examiner—Floyd D. Higel
Attorney, Agent, or Firm—Curtis, Morris & Safford

[57] ABSTRACT

Dyestuffs of the formula (1)

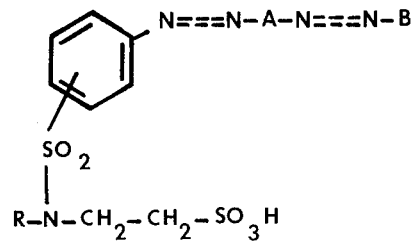

wherein A is an optionally substituted radical of the benzene or naphthalene series which, however, does not contain a sulfonic acid group, B is the radical of a coupling component of the benzene, naphthalene, pyrazolone, aminopyrazole, hydroxyquinoline or acetoacetyl-arylamide series, which, however, does not contain a sulfonic acid group, and R is hydrogen or the lower alkyl.

These dyestuffs are very well water-soluble in spite of having a high molecular weight and containing only one sulfonic acid group. They are especially suitable for dyeing or printing materials of natural and synthetic nitrogen-containing fibers, such as wool, silk, polyamide or polyurethane fibers, preferably if dyed from an acid to neutral dye bath. They show a very good colour buildup and migration power when being applied on the material mentioned which allows to obtain even dyeings of good fastnesses to light and to wet processing, for example, to washing and to perspiration.

5 Claims, No Drawings

FIBER-REACTIVE, WATER-SOLUBLE DISAZO DYES CONTAINING AN N-B-SULFOETHYLAMIDE GROUP

The present invention relates to novel water-soluble disazo dyestuffs and a process for preparing them.

These dyestuffs correspond in the form of the free acid to the general formula (1)

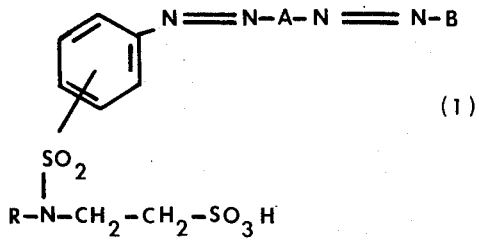

(1)

wherein A is an optionally substituted radical of the benzene or napthalene series which, however, does not contain a sulfonic acid group, B is the radical of a coupling component of the benzene, naphthalene, pyrazolone, aminopyrazolone, hydroxyquinoline or acetoacetyl-arylamide series, which, however, does not contain a sulfonic acid group, and R is hydrogen or the lower alkyl, especially the methyl, ethyl or propyl group.

This invention also relates to a process for preparing these dyestuffs.

This process comprises diazotizing a diazo component of the general formula (2)

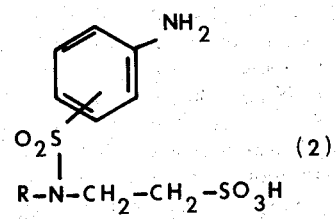

(2)

wherein R is as defined above, in usual manner, coupling the diazonium compound with a primary aromatic amine, with its corresponding sulfamic acid or its corresponding ω-arylamino-methansulfonic acid, all of them being capable of coupling in para-position to the amino grouping and which have the general formula (2a)

H — A — NH — Z    (2a)

wherein A is as defined above and Z is a hydrogen atom, a methylene-sulfonic acid radical of the formula —CH$_2$-SO$_3$H or a sulfonic acid group, diazotizing according to usual methods the amino azo dyestuff so obtained of the general formula (3)

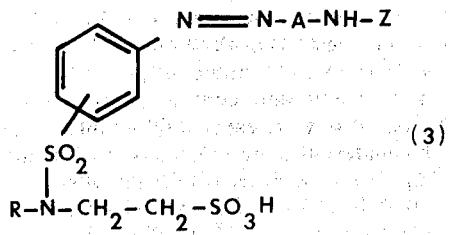

(3)

wherein A, R and Z are as defined above, after having split off the methylene-sulfonic acid radical by alkaline or acid hydrolysis, if Z is the grouping —CH$_2$-SO$_3$H and reacting them with compounds of the formula H - B capable of coupling, wherein B is as defined above.

A preferred embodiment of this invention are dyestuffs of the formula (1) wherein A is a phenylene or naphthylene radical which is unsubstituted or substituted by alkyl of from 1 to 4 carbon atoms, alkoxy of from 1 to 4 carbon atoms, chlorine, acetylamino, benzoylamino and/or trifluoromethyl, B is the radical of phenol which may be substituted by chlorine, alkyl of from 1 to 4 carbon atoms and/or alkoxy of 1 – 4 carbon atoms, or the radical of aniline which may be substituted by chlorine, alkyl of 1 – 4 carbon atoms, alkoxy of from 1 to 4 carbon atoms and/or acetylamino, or the radical of aniline substituted at the N-atom by lower alkyl, β-hydroxyethyl, β-cyanoethyl, β-acetoxyethyl wherein the nucleus is unsubstituted or substituted by lower alkyl, lower alkoxy or chlorine, or the radical of the α-naphthol or β-naphthol which are unsubstituted or substituted by —SO$_2$-NH$_2$, a lower alkyl sulfonamide group, acetylamino, benzoylamino or phenylamino wherein the phenyl nucleus is unsubstituted or substituted by lower alkyl, lower alkoxy or chlorine, or the radical of the 2,3-naphthoic acid anilide which is unsubstituted or substituted in the anilide radical by chlorine, lower alkyl, lower alkoxy and/or the cyano group, or the radicals of the 1-phenyl-3-methyl- or —3-carboxy- or —3-carbo-lower alkoxy-pyrazolone-(5), the phenyl radical of which may be substituted by chlorine, lower alkyl and/or lower alkoxy, or of the 1-naphthyl-3-methyl- or —3-carboxy- or —3-carbo-lower-alkoxy-pyrazolone(5)

or of the radical of the acetoacetylanilide the nucleus of which may be substituted by lower alkyl, lower alkoxy and/or chlorine, and R is defined as hydrogen or lower alkyl. The term "lower" means an alkyl radical of 1 – 4 carbon atoms.

The diazo components of the formula (2) are obtained preferably by reacting aminoaryl-sulfonic-acid chlorides the amino group of which is present in a protected or masked form, for example, acetanilide-4-sulfochloride or nitrobenzene-3-sulfochloride with aminoethane- or N-methylaminoethane-sulfonic acid in water in the presence of alkali metal hydroxides or alkali metal carbonates and following alkaline or acid hydrolysis of the acetamino group or catalytic reduction of the nitro group. The diazonium salts obtained in usual manner from the amines of formula (2) are coupled to give the amino azo dyestuffs of the general formula (3) at highly to slightly acid pH at a temperature ranging from 0° to 40° C. As coupling components of the formula (2a) aniline and 1-aminonaphthalene derivatives may be used which do not contain a sulfonic acid group. These aryl amines capable of coupling may be substituted by lower alkoxy or lower alkyl groups having from 1 to 4 carbon atoms, by chlorine atoms, by acetylamino, benzoylamino or trifluoromethyl groups. Those compounds are, for example: o-toluidine, m-toluidine, 2,5- and 2,6-dimethylaniline, m-chloroaniline, ortho- or m-anisidine, ortho- or meta-phenetidine, ortho-n-propylaniline, meta-n-propylaniline, ortho-isopropylaniline or the meta-isomer thereof, meta-tert-butylaniline, 2-ethyl-aniline, m-trifluoromethyl-aniline, m-acetylamino-aniline, amino-hydroquinonedimethyl-ether, 1-naphthyl amine, 2-methoxy- and 2-ethoxy-1-naphthylamine as well as the sulfamide compounds and the N-methylene-sulfonic acid compounds of all the compounds mentioned above, for example, compounds of the formulae derivatives of pyrazolone and 5-amino-pyrazole, of 2- or 4-oxyquinoline, of aniline, of 1- or 2-naphthylamine and of acetoacetarylides.

Coupling components of this type are, for example, the following: phenol, p-chlorophenol, p-cresol, o-

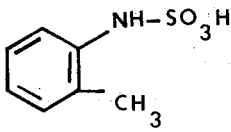
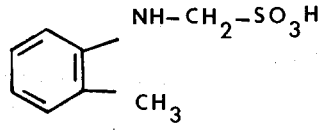
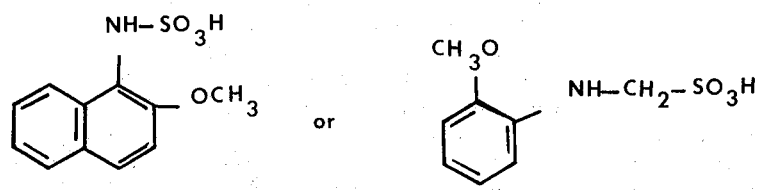

or generally the corresponding derivatives of the aryl amines of the formula (2a), preferably those mentioned above.

The aminoazo dyestuffs of the general formula (3) wherein Z is hydrogen or a sulfo group are diazotized according to the usual diazotizing methods in strongly acid solution, the sulfo group being split off in this reaction if compounds of the formula (3) comprising the —$SO_3H$ group for Z are subjected to diazotation. If using compounds of the formula (3) in which Z is the grouping —$CH_2$-$SO_3H$, alkaline hydrolysis or an acid hydrolysis in strongly acid solution at a temperature ranging from 40° to 100° C must be effected before diazotation whereafter the amine set free by acid can be diazotized at a temperature ranging from 0° to 10°C in an acid medium.

The diazonium salts of the aminoazo dyestuffs of the formula (3) so obtained are coupled with the compounds of the formula H - B capable of coupling at a strongly acid to neutral pH-range, or at a slightly acid to alkaline pH-range at a temperature of from 0° to 40° C. The pH in the coupling process depends on the coupling component used, especially whether amino, phenol or enol compounds are used. According to known coupling methods, coupling is carried out for example in such a manner that the acid diazonium salt solutions are rendered less strongly acid until neutral by the addition of sodium or potassium carbonate, sodium bicarbonate, sodium phosphate or sodium acetate or of other inorganic compounds having a slightly alkaline action, and that an acid solution of an amino compound or a neutral or alkaline solution of a hydroxy compound is, then, added and the pH is adjusted accordingly, if necessary, or that acid solutions of the amino compounds capable of coupling, or strongly alkaline solutions of the hydroxy compounds capable of coupling, are added to the acid diazonium salt solutions and only afterwards the pH is raised by the inorganic compounds having an alkaline effect, to 1.5 to 5, the coupling range of the amines, or to 6 to 12, the coupling range of the hydroxy compounds.

As coupling components of the formula H - B all those known one are suitable, which do not contain sulfonic acid groups, such as the derivatives of phenol, of α- or β-naphthol, 2,3-naphthoic acid arylides and cresol, resorcinol, ortho-anisidine, m-chlorophenol, ortho- and para-ethylphenol, 2,4-dimethyl- or 2,4-diethylphenol, 2,6-dimethyl- or 2,6-diethylphenol, 2-methyl-4-chlorophenol, the three isomeric toluidines, 2,5-dimethyl-aniline, ortho- and para-phenetidine, 2,6-dimethylaniline, 2-ethyl or 2-iso-butoxy-aniline, m-chloroaniline- 2-methyl-3-chloroaniline, p-cresidine, 2-n-propylaniline, ortho-iso-propylaniline or the meta-isomer thereof, 3-acetaminoaniline, meta-tert.-butylaniline; the N-substituted compounds of these anilines, for example, N,N-dimethyl- or N,N-diethyl-aniline and the N-β-hydroxy-, N-β-cyano- or N-β-acetoxy-compounds thereof, for example, N-ethyl-N-β-hydroxyethyl-aniline or N-β-cyano-ethyl-m-toluidine, N-methyl- or N-propylaniline or —m-toluidine, N-ethyl- or N,N-di-n-butyl-aniline or N-(β-hydroxyethyl-)aniline and the methyl and ethyl mono substituted compounds thereof monosubstituted at the nucleus; 2,4-dihydroxyquinoline, α-naphthol, β-naphthol, 5-, 6-, 7- or 8-sulfonamide- or N-methylsulfonamide- or 5-, 6-, 7- or 8-acetylamino- or benzoylamino-compounds of the α- and β-naphthol; the phenyl amino-naphthol compounds and those derivatives thereof which are substituted at the phenyl nucleus by chlorine, methyl, methoxy or ethoxy groups; 2,3-napthoic acid anilide and those derivatives thereof which are substituted at the anilide nucleus by chlorine, methyl, ethyl, methoxy, ethoxy and/or cyano groups; 1-phenyl-3-methyl-pyrazolone-(5) or the 3-carboxylic acid or 3-carboxylic acid-ethyl ester compounds thereof, the compounds of the pyrazolones substituted at the phenyl nucleus by chlorine, methyl, methoxy and/or ethoxy groups, for example, 1-(2′,5′-dichlorophenyl)-3-methyl-pyrazolone-(5)-one; the 1-naphthyl-3-methyl- or —3-carboxylic acid-pyrazole-5-ones; the acetoacetanilide derivatives, for example, acetoacet-(2,4-dimethoxy)-anilide and acetoacet-(4-methoxy)-anilide.

The dyestuffs of the formula (1) of the invention are very well water-soluble in spite of having a high molecular weight and containing only one sulfonic acid group. They are especially suitable for dyeing or printing materials of natural and synthetic nitrogen-containing fibers, such as wool, silk, polyamide or polyurethane fibers from an acid to neutral dye bath at a temperature ranging from 80° to 120° C, preferably at about 100°C, using the auxiliaries generally used in the dyeing or printing industry. The dyestuffs of the invention show a very good colour build-up and migration power when being applied on the material mentioned which allows to obtain even dyeings of good fastness to light and to wet processing, for example, to washing and to perspiration.

The following Examples illustrate the invention, the parts and percentages being by weight unless stated otherwise; the relation-ship of parts by weight to parts by volume is as a gram to a cubic centimeter.

EXAMPLE 1

A solution of 29.4 parts of 1-aminobenzene-4-sulfonic acid-(N-methyl-N-β-sulfoethyl)-amide in 200 parts by volume of water was charged with 50 parts of ice, 25 parts of hydrochloric acid of 37 % strength and, dropwise, with 200 parts by volume of 5N sodium nitrite solution. To this limpid diazonium salt solution was added a solution of 10.7 parts of m-toluidine and 10 parts of hydrochloric acid of 37 % strength in 100 parts by volume of water. The temperature of the coupling mixture was maintained at 10°C with ice, the pH was maintained at 1.5 for 1 hour, and then adjusted at 3.5 with crystalline sodium acetate. After 12 hours, the mixture was suction-filtered and washed with 5 % hydrochloric acid and dried. 37.1 parts of this aminoazo dyestuff were dissolved in 360 parts by volume of water with 5.5 parts of calcined sodium carbonate at 50° C and charged with 18 parts by volume of 5N sodium nitrite solution. The whole was slowly added dropwise to a mixture of 400 parts of ice and 30 parts of hydrochloric acid of 37 % strength. After 3 hours, a little amidosulfonic acid was added and the pH was adjusted at 6.0 with calcined sodium carbonate. A solution of 13 parts of 2-napthol dissolved with 4.0 parts of sodium hydroxide in 150 parts by volume of water were added. The pH of the coupling mixture was again adjusted at 12.0 and stirring was continued for 5 hours. After having adjusted the pH at 6.0 with hydrochloric acid of 37 % strength, the dyestuff was salted out with 20 % of sodium chloride, calculated on the solution volume, suction-filtered and dried.

A red-brown powder was obtained which yielded on nylon 6 or nylon 66 a limpid, even, red dyeing fast to light and washing when being dyed from a slightly acetic acid, boiling dyebath.

The dyestuff had the following structure:

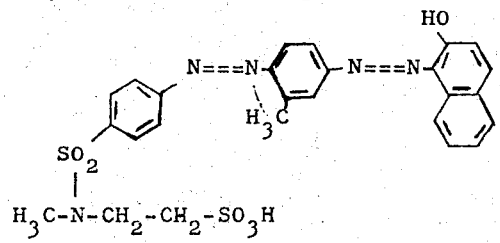

EXAMPLE 2

When replacing in Example 1 2-naphthol by 7.6 parts of phenol which had been dissolved with 4.0 parts of sodium hydroxide in 50 parts by volume of water, and after a reaction time of 5 hours at pH 12.0 which thereafter had been adjusted at 6.5 with concentrated hydrochloric acid, salting out with sodium chloride, suction-filtering and drying, a yellow brown dyestuff powder was obtained which yielded on polyamide fibers even, orange dyeings fast to light and wet processing when being dyed from a slightly acetic acid to neutral boiling dyebath.

The dyestuff had the formula:

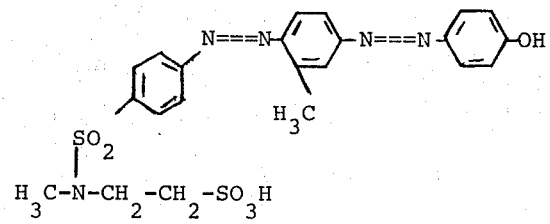

EXAMPLE 3

A solution of 29.4 parts of 1-aminobenzene-3-sulfonic acid-(N-methyl-N-β-sulfoethyl)-amide in 200 parts by volume of water was charged with 50 parts of ice, 25 parts of hydrochloric acid of 37 % strength and, dropwise, with 20 parts by volume of 5N-sodium nitrite solution. To that limpid diazonium salt solution a further 100 parts of ice was added and a suspension of 14.3 parts of 1-naphthyl-amine, 12.5 parts of concentrated hydrochloric acid in 250 parts by volume of water, heated to 50° to 60° C, was slowly led in. The pH of the coupling mixture was adjusted at 1.2 to 1.5 with crystalline sodium acetate and was again stirred for 10 hours at room temperature. Then, the mixture was suctionfiltered, washed with 5% hydrochloric acid and dried. 40.3 parts of this aminoazo dyestuff were adjusted in 150 parts by volume of water at pH 7.0 with calcined sodium carbonate, stirred and salted out with 30 g of sodium chloride. 18.5 parts by volume of 5N sodium nitrite solution were added, the mixture was cooled to 10° C and 48 parts by volume of sulfuric acid of 48 % strength were added at once. After 5 hours, a little amidosulfonic acid was added to the diazo suspension, in order to destroy excessive nitrous acid. Then, a solution of 16.9 parts of N-ethyl-β-cyanoethyl-m-toluidine and 10 parts of concentrated hydrochloric acid in 50 parts by volume of water were added and the pH was adjusted at 2.0 to 3.0 adding crystalline sodium acetate. After 5 hours, coupling was completed, the pH of the dyestuff suspension was adjusted at 6.0 with calcined sodium carbonate and the dyestuff was isolated by salting out with sodium chloride. After drying a darkbrown dyestuff powder was obtained which yielded on polyamide fibers, for example on nylon 6 or nylon 66 even, bordo dyeings fast to light and very fast to wet processing when being dyed from a boiling, slightly acid dyebath.

The dyestuff had the following structure:

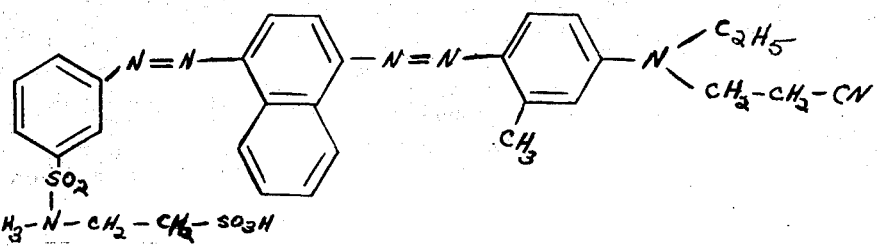

EXAMPLE 4

A solution of 28.0 parts of 1-aminobenzene-4-sulfonic acid-(N-β-sulfoethyl)-amide in 200 parts by volume of water containing 50 parts of ice and 25 parts of hydrochloric acid of 37 % strength was charged with 20 parts by volume of 5N sodium nitrite solution. To this limpid diazonium solution a solution of 10.7 parts of o-toluidine and 10 parts of concentrated hydrochloric acid in 50 parts by volume of water were added. The temperature of the coupling mixture was maintained at 15°C with ice, the pH was gradually adjusted at 2.5 with crystalline sodium acetate. After 6 hours, the dyestuff was suction-filtered, washed with hydrochloric acid of 5 % strength and dried. 35.8 parts of this aminoazo dyestuff were dissolved in 350 parts by volume of water with 6 parts of calcined sodium carbonate at 40°C, 118 parts by volume of 5N sodium nitrite solution were added and the solution obtained was slowly added dropwise to a mixture of 400 parts of ice and 30 parts of hydrochloric acid of 37 % strength. After 3 hours, amidosulfonic acid was added and the pH was adjusted at 6.0 with sodium carbonate. Then, a solution of 15.7 parts of 1-phenyl-3-methyl-5-pyrazolone and of 4.0 parts of sodium hydroxide in 50 parts by volume of water was added. The pH of the coupling mixture was adjusted at 12.0. After 4 hours, pH 6.0 was adjusted with concentrated hydrochloric acid and the dyestuff was salted out with sodium chloride. After drying, a brown dyestuff powder was obtained which yielded on polyamide and polyurethane fibers, when dyed from a slightly acid boiling dyebath, very even, yellow brown dyeings of very good fastness to light and to wet processing.

The dyestuff had the formula:

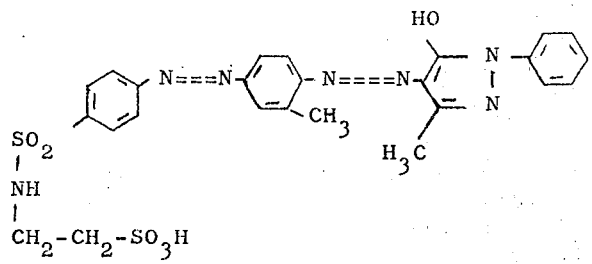

EXAMPLE 5

27.5 Parts of 40 % sodium hydrogensulfite solution were mixed with 11 parts by volume of a 30 % formaldehyde solution, stirred for a short while and 10.7 parts of m-toluidine were added at 60°C. The solution was diluted with 200 parts by volume of water and heated to 60° C until the solution became limpid. After cooling this solution to 5°C a diazonium salt solution was added, which had been prepared from 29.4 parts of 1-amino-benzene-4-sulfonic acid-(N-methyl-N-β-sulfoethyl)-amide according to Example 1, and the pH was adjusted at 4.5 to 5.5. After coupling had been completed, sodium hydroxide was added in such an amount as to yield a 8 % sodium hydroxide solution. This solution was heated for 3 hours under reflux and adjusted, after cooling to room temperature, at pH 1.5 with concentrated hydrochloric acid. The aminoazodyestuff which precipitated was suction-filtered and washed with 5 % hydrochloric acid.

37.1 Parts of this aminoazo dyestuff were diazotized as described in Example 1, the pH of the diazonium salt suspension was then adjusted at 6.0 with calcined sodium carbonate. A solution consisting of 13.6 parts of 4-iso-propyl-phenol and 4.0 parts of sodium hydroxide in 150 parts by volume of water was added. The pH of this coupling reaction mixture was adjusted at 12.0 and again stirred for another 5 hours. After having added hydrochloric acid of 37 % strength until the pH of the mixture had reached 6.0, the dyestuff was salted out with sodium chloride in an amount of 20 %, calculated on the volume of the solution, suction-filtered and dried.

A yellow brown dyestuff powder was obtained which yielded with water and a usual thickener, for example, crystal gum, a printing paste which gave upon being printed on polyamide fibers after a steaming period of 20 minutes and at 20° C and after the usual finishing process, orange prints having good fastness to wet processing and very good fastness to light.

The dyestuff prepared according to this Example had the formula:

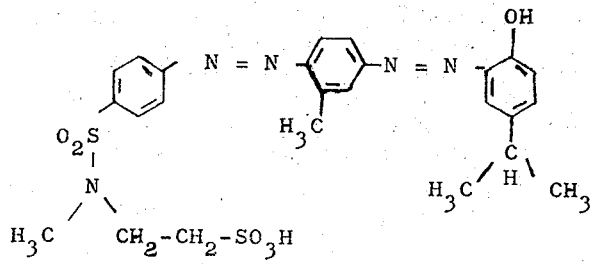

EXAMPLE 6

29.4 Parts of 1-aminobenzene-4-sulfonic acid-(N-methyl-N-β-sulfoethyl)-amide were diazotized in an analogous manner as described in Example 1. The diazonium salt solution was fed into a solution of 20.9 parts of m-toluidine-N-sulfonic acid sodium and 42 parts of crystalline sodium acetate in 300 parts by volume of water. After coupling had been completed, 60 parts of hydrochloric acid of 37 % strength were added and the mixture was diazotized by introducing 20 parts by volume of 5 N sodium nitrite solution at 10° C. The suspension of the diazo-azo dyestuff was charged with calcined sodium carbonate until pH 6.0 and then, a solution of 14.0 parts of 2-naphthol and 4.0 parts of sodium hydroxide dissolved in 150 parts by volume of water were added. The pH of the coupling mixture was adjusted at 12.0. Then, working up followed in the same manner as carried out in Example 1.

The dyestuff so obtained had the formula indicated in Example 1. When this dyestuff was applied on a fabric of polyamide fiber by means of a padding liquor which had been prepared in the same manner as the printing paste mentioned in Example 5, the amount of usual thickening agent used being, however, slighter, and the padding liquor had been adjusted at pH 6.0 with acetic acid and when the padded fabric was steamed with normal steam at 102° to 103° C during 20 minutes, an intense, limpid and even, red dyeing was obtained which was very fast to washing and to light.

The following Table gives a list of further dyestuffs which had been prepared according to the methods described hereinbefore.

| Ex. No. | Diazo component of the general formula 2 | Coupling component HA—NH—Z | Coupling component H—B | Shade on polyamide |
|---|---|---|---|---|
| 7 | HO₃SH₂CH₂C(H₃C)(H)N—O₂S—C₆H₄—NH₂ | H₃C—C₆H₄—NH₂ (meta) | 4-methylphenol (OH, CH₃) | orange |
| 8 | dito | dito | 3-methyl-N-ethyl-N-(2-cyanoethyl)aniline | red brown |
| 9 | dito | dito | 3-hydroxy-N-(2-methoxyphenyl)-2-naphthamide | bluish red |
| 10 | HO₃SH₂CH₂C—N(H)—O₂S—C₆H₄—NH₂ | 3-methyl-C₆H₄—NH—CH₂—SO₃Na | 2-naphthol | red |
| 11 | dito | dito | H₃C—CO—CH₂—CO—NH—C₆H₃(OCH₃)(OCH₃) | yellow brown |
| 12 | HO₂SH₂CH₂C—N(CH₃)—O₂S—C₆H₄—NH₂ | 2,4-dimethylaniline | phenol | orange |
| 13 | dito | 2-methoxy-5-methylaniline | 3-(2-methoxyphenylamino)-2-naphthol | violet |
| 14 | 3-NH₂-C₆H₄—SO₂—N(CH₃)—CH₂—CH₂—SO₃H | 2-methoxy-4-methylaniline | 3-methyl-N,N-bis(2-hydroxyethyl)aniline | navy blue |
| 15 | dito | 3-methylaniline | 3-methyl-N-ethyl-N-(2-cyanoethyl)aniline | red brown |
| 16 | dito | dito | 2-naphthol | red |

| Ex. No. | Diazo component of the general formula 2 | Coupling component HA—NH—Z | Coupling component H—B | Shade on polyamide |
|---|---|---|---|---|
| 17 | 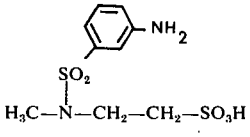 | 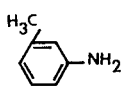 | 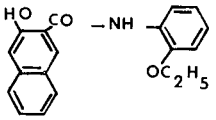 | bluish red |
| 18 | 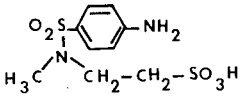 | dito | 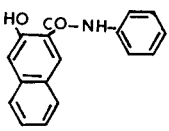 | bluish red |
| 19 | dito | 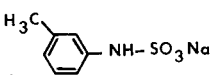 | 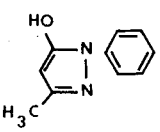 | orange |
| 20 | 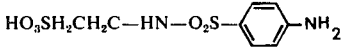 | 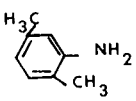 | 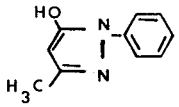 | yellow brown |
| 21 | 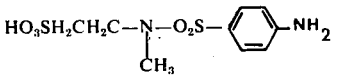 | 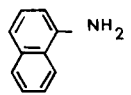 | dito | brown |
| 22 | 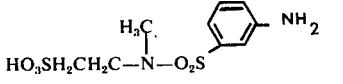 | 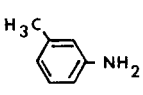 | 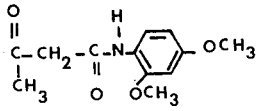 | orange |
| 23 | dito | dito | 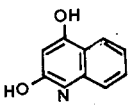 | orange |
| 24 | dito | dito | 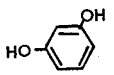 | orange |
| 25 | dito | dito | 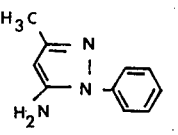 | orange |
| 26 | dito | 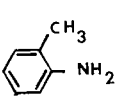 | 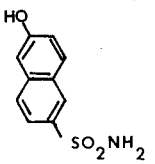 | red |

What we claim is:

1. A water-soluble disazo-dyestuff which corresponds in the form of the free acid to the formula

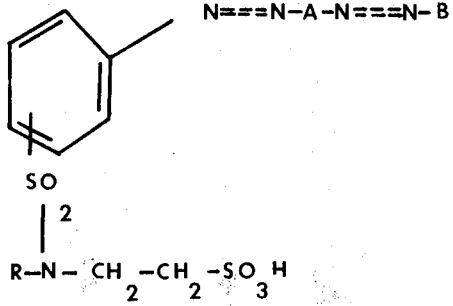

wherein A is phenylene, naphthylene or phenylene or naphthylene substituted by alkyl of from 1 to 4 carbon atoms, alkoxy of from 1 to 4 carbon atoms, chlorine, acetylamino, benzoylamino or trifluoromethyl, B is phenolyl or phenolyl substituted by chlorine, alkyl of from 1 to 4 carbon atoms or alkoxy of 1 - 4 carbon atoms, or anilino or anilino substituted by chlorine, alkyl of 1 - 4 carbon atoms, alkoxy of from 1 to 4 carbon atoms or acetylamino, or anilino substituted at the N-atom by lower alkyl, β-hydroxyethyl, β-cyanoethyl, β-acetoxyethyl wherein the nucleus is unsubstituted or substituted by lower alkyl, lower alkoxy or chlorine, or α-naphtholyl, β-naphtholyl or α-naphtholyl or β-naphtholyl substituted by —SO$_2$-NH$_2$, lower alkyl sulfonamide acetylamino, benzoyl-amino or phenyl-amino wherein the phenyl nucleus is unsubstituted or substituted by lower alkyl, lower alkoxy or chlorine, or 2,3 naphthoic acid anilido substituted in the anilido radical by chlorine, lower alkyl, lower alkoxy or cyano, or acetoacetylanilido or acetoacetylanilido substituted in the anilido portion by lower alkyl, lower alkoxy or chlorine, and R is hydrogen or lower alkyl.

2. The disazo dyestuff as claimed in claim 1 of formula

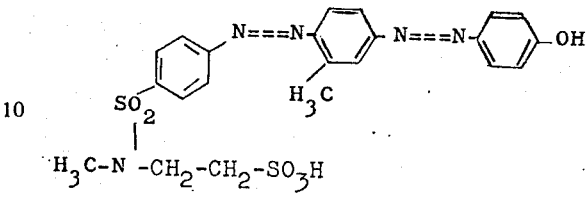

3. The disazo dyestuff as claimed in claim 1 of formula

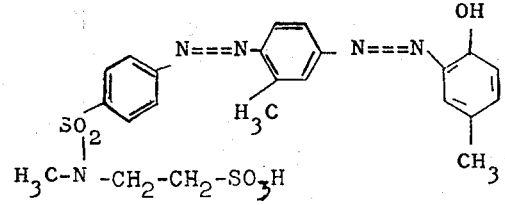

4. The dyestuff as claimed in claim 1 of formula

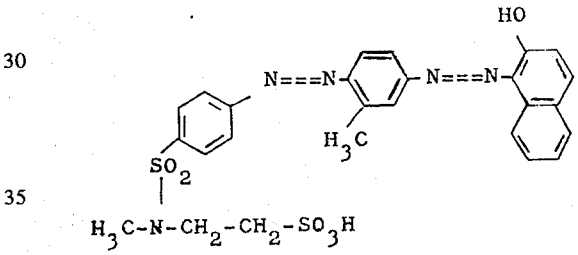

5. The dyestuff as claimed in claim 1 of formula

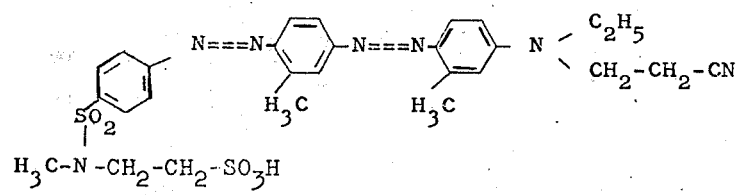

* * * * *